(12) United States Patent
Kim

(10) Patent No.: US 10,990,780 B2
(45) Date of Patent: Apr. 27, 2021

(54) DISPLAY DEVICE AND ELECTRONIC DEVICE HAVING THE SAME

(71) Applicant: Samsung Display Co., Ltd., Yongin-si (KR)

(72) Inventor: Hakgyu Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 331 days.

(21) Appl. No.: 16/007,953

(22) Filed: Jun. 13, 2018

(65) Prior Publication Data

US 2019/0205605 A1  Jul. 4, 2019

(30) Foreign Application Priority Data

Jan. 2, 2018 (KR) ........................ 10-2018-0000366

(51) Int. Cl.
 *G06K 9/00* (2006.01)
 *G06K 9/03* (2006.01)
(52) U.S. Cl.
 CPC ....... *G06K 9/00013* (2013.01); *G06K 9/0004* (2013.01); *G06K 9/03* (2013.01)
(58) Field of Classification Search
 CPC ..... G06K 9/00013; G06K 9/0004; G06K 9/03
 USPC ...................................................... 382/125
 See application file for complete search history.

(56) References Cited

U.S. PATENT DOCUMENTS

| | | | | |
|---|---|---|---|---|
| 7,738,916 B2* | 6/2010 | Fukuda | ............... | G06K 9/00013 455/556.1 |
| 9,164,620 B2* | 10/2015 | Hotelling | ............... | G06F 3/0418 |
| 9,430,692 B2* | 8/2016 | Hirokawa | .......... | G06K 9/00013 |
| 9,697,765 B2* | 7/2017 | Chung | ................ | G09G 3/3225 |
| 9,710,689 B2 | 7/2017 | Evans et al. | | |
| 9,773,455 B2* | 9/2017 | Chung | ................ | G09G 3/3225 |
| 9,928,773 B2 | 3/2018 | Kim et al. | | |
| 9,940,872 B2* | 4/2018 | An | ........................ | G09G 3/3233 |
| 9,947,265 B2* | 4/2018 | Park | ..................... | G09G 3/3208 |
| 10,068,120 B2* | 9/2018 | Lyon | .................... | G06K 9/0002 |
| 10,163,389 B2* | 12/2018 | An | ........................ | G09G 3/3208 |
| 10,198,612 B1* | 2/2019 | Hsu | ...................... | G06K 9/4642 |
| 10,248,834 B2* | 4/2019 | Xu | ....................... | G06K 9/00087 |
| 10,366,272 B2* | 7/2019 | Song | ................... | G06K 9/0004 |
| 10,452,937 B2* | 10/2019 | Jin | ........................ | G06F 3/0416 |
| 10,867,551 B2* | 12/2020 | Ok | ....................... | G09G 3/3208 |

(Continued)

FOREIGN PATENT DOCUMENTS

| | | |
|---|---|---|
| KR | 10-2016-0081581 | 7/2016 |
| KR | 10-2017-0003213 | 1/2017 |
| KR | 10-2017-0087093 | 7/2017 |

(Continued)

*Primary Examiner* — Jonathan S Lee
(74) *Attorney, Agent, or Firm* — H.C. Park & Associates, PLC

(57) ABSTRACT

A display device and an electronic device having the same including a display panel including a display area on which an image is displayed and a fingerprint scan area overlapped with the display area, and a fingerprint scan area compensator configured to convert a fingerprint scan image data provided to pixels included in the fingerprint scan area to a degradation compensating image data that compensates a degradation of the pixels included in the fingerprint scan area and output the degradation compensating image data in the fingerprint scan mode.

18 Claims, 10 Drawing Sheets

(56) References Cited

U.S. PATENT DOCUMENTS

2017/0206819 A1* 7/2017 Pyo ................. G09G 3/2092
2017/0220838 A1* 8/2017 He .................. G06F 3/0412

FOREIGN PATENT DOCUMENTS

KR  10-2017-0105272  9/2017
KR  10-2017-0109135  9/2017

* cited by examiner

DISPLAY DEVICE AND ELECTRONIC DEVICE HAVING THE SAME

CROSS-REFERENCE TO RELATED APPLICATION

This application claims priority from and the benefit of Korean Patent Application No. 10-2018-0000366, filed on Jan. 2, 2018, which is hereby incorporated by reference for all purposes as if fully set forth herein.

BACKGROUND

Field

Exemplary embodiments of the invention relate generally to a display device and an electronic device having the same.

Discussion of the Background

Recently, various additional functions such as banking, security, etc., using personal information as well as a communication function such as a telephone call, a message, etc., are provided by a personal portable appliance, such as a smart-phone, a tablet PC, etc. Thus, various methods, such as an iris scan, a fingerprint scan, a face scan, etc., providing for a security of the personal portable appliance have been studied. Specially, the fingerprint scan method having high security with low cost is widely used.

The above information disclosed in this Background section is only for understanding of the background of the inventive concepts, and, therefore, it may contain information that does not constitute prior art.

SUMMARY

Exemplary embodiments provide a display device capable of compensating a degradation of a fingerprint scan area.

Exemplary embodiments also provide an electronic device capable of compensating a degradation of a fingerprint scan area.

Additional features of the inventive concepts will be set forth in the description which follows, and in part will be apparent from the description, or may be learned by practice of the inventive concepts.

An exemplary embodiment of the invention provides a display device having a display panel including a display area on which an image is displayed; a fingerprint scan area overlapped with the display area; and a fingerprint scan area compensator configured to convert a fingerprint scan image data provided to pixels included in the fingerprint scan area to a degradation compensating image data that compensates a degradation of the pixels included in the fingerprint scan area and output the degradation compensating image data in the fingerprint scan mode.

The fingerprint scan area compensator may include a stress data converter configured to convert the degradation compensating image data to a stress data; a memory configured to store the stress data and output an accumulated stress data on which the stress data are accumulated; and a degradation compensator configured to compensate the fingerprint scan image data to the degradation compensating image data based on the accumulated stress data.

The stress data may include luminance information of the degradation compensating image data.

The memory may include a volatile memory configured to receive the stress data and output the accumulated stress data by accumulating the stress data and a non-volatile memory configured to store the accumulated stress data provided from the volatile memory.

The volatile memory may provide the accumulated stress data to the non-volatile memory in a predetermined cycle, and the non-volatile memory may provide the accumulated stress data to the volatile memory when power to the display device is turned on.

The degradation compensator may include a first calculator configured to calculate a degradation compensating amount of the fingerprint scan area based on the accumulated stress data and a second calculator configured to generate the degradation compensating image data based on the degradation compensating amount.

The stress data converter may select one of the pixels included in the fingerprint scan area as a representative pixel; convert the degradation compensating image data provided to the representative pixel to the stress data; and sequentially change the representative pixel.

The stress data converter may convert an average value of the degradation compensating image data provided to the pixels included in the fingerprint scan area to the stress data.

The stress data converter may convert a red degradation compensating image data provided to a red sub-pixel of the pixels included in the fingerprint scan area to a red stress data; convert a green degradation compensating image data provided to a green sub-pixel of the pixels included in the fingerprint scan area to a green stress data; and convert a blue degradation compensating image data provided to a blue sub-pixel of the pixels included in the fingerprint scan area to a blue stress data.

The memory may store a red accumulated stress data on which the red stress data are accumulated; a green accumulated stress data on which the green stress data are accumulated; and a blue accumulated stress data on which the blue stress data are accumulated.

The display device may further include a timing controller. The fingerprint scan area compensator may be coupled to the timing controller, and a memory of the fingerprint scan area compensator may be located in the timing controller The display device may further include a data driver configured to provide a data signal to the display panel and a timing controller configured to generate a control signal that controls the data driver. The data driver and the timing controller may be implemented as an embedded integrated circuit; the fingerprint scan area compensator may be coupled to the embedded integrated circuit; and a memory of the fingerprint scan area compensator may be located in the embedded integrated circuit.

The fingerprint scan area compensator may be coupled to an external device; and a memory of the fingerprint scan area compensator may be located in the external device.

The fingerprint scan area compensator may include a stress data converter configured to convert the fingerprint scan image data to a stress data; a memory configured to store the stress data and output an accumulated stress data on which the stress data are accumulated; and a degradation compensator configured to generate the degradation compensating image data that compensates a degradation of the fingerprint scan area based on the accumulated stress data.

The stress data may include time information during which the fingerprint scan image data is provided.

The memory may include a volatile memory configured to receive the stress data and output the accumulated stress data by accumulating the stress data; and a non-volatile memory configured to store the accumulated stress data provided from the volatile memory.

Another exemplary embodiment of the invention provides an electronic device including a display device and a processor that controls the display device. The display device of this exemplary embodiment includes a display panel including a display area on which an image is displayed and a fingerprint scan area overlapped with the display area and a fingerprint scan area compensator configured to convert a fingerprint scan image data provided to pixels included in the fingerprint scan area to a degradation compensating image data that compensates a degradation of the pixels included in the fingerprint scan area and output the degradation compensating image data in the fingerprint scan mode.

The fingerprint scan area compensator may include a stress data converter configured to convert the degradation compensating image data to a stress data; a memory configured to store the stress data and output an accumulated stress data on which the stress data are accumulated; and a degradation compensator configured to compensate the fingerprint scan image data to the degradation compensating image data based on the accumulated stress data.

The fingerprint scan area compensator may include a stress data converter configured to convert the fingerprint scan image data to a stress data; a memory configured to store the stress data and output an accumulated stress data on which the stress data are accumulated; and a degradation compensator configured to generate the degradation compensating image data that compensates a degradation of the fingerprint scan area based on the accumulated stress data.

The fingerprint scan area compensator may generate the degradation compensating image data of the pixels included in the fingerprint scan area; and the fingerprint scan area compensator may not generate the degradation compensating image data of the pixels not included in the fingerprint scan area Therefore, the display device and the electronic device having the same may compensate pixels in the fingerprint scan area by calculating the degradation amount of the pixels in the fingerprint scan area based on the fingerprint scan image data provided to the pixels in the fingerprint scan area of the display panel and generating the degradation compensating image data to which the fingerprint scan image data is compensated based on the degradation amount. Here, the display device may decrease a capacity of memory that stored the accumulated stress data by compensating the pixels included in the fingerprint scan area. Further, the display device may precisely sense the fingerprint of the user by maintain the luminance of the fingerprint scan area by compensating the degradation of the pixels in the fingerprint scan area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
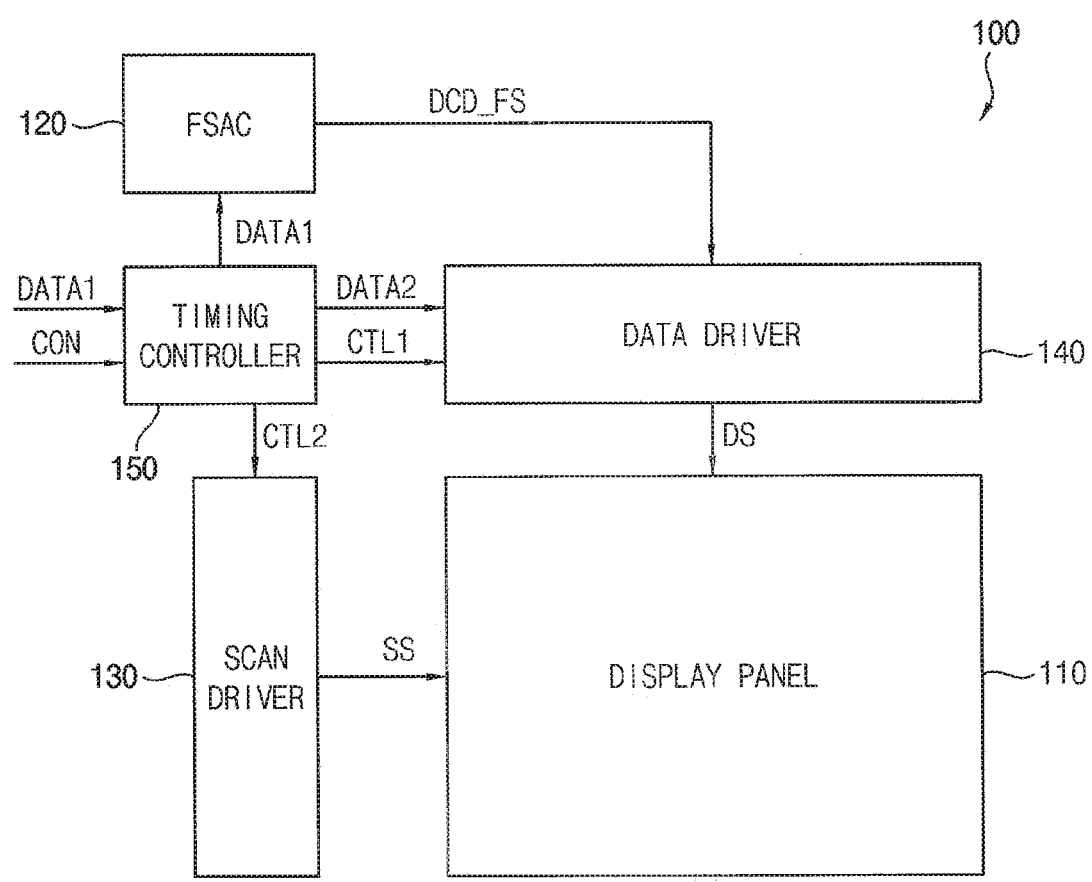
FIG. 1 is a block diagram illustrating a display device according to an exemplary embodiment.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, the inventive concepts will be explained in detail with reference to the accompanying drawings.

Figure 2A:
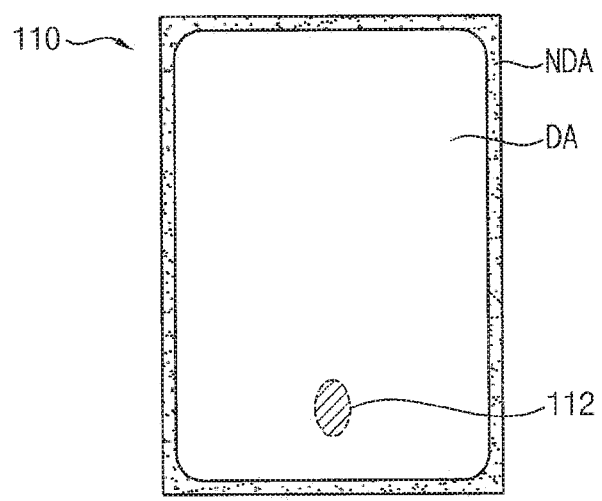
FIG. 2A and FIG. 2B are diagrams illustrating a display panel included in the display device of FIG. 1.
Figure 2B:
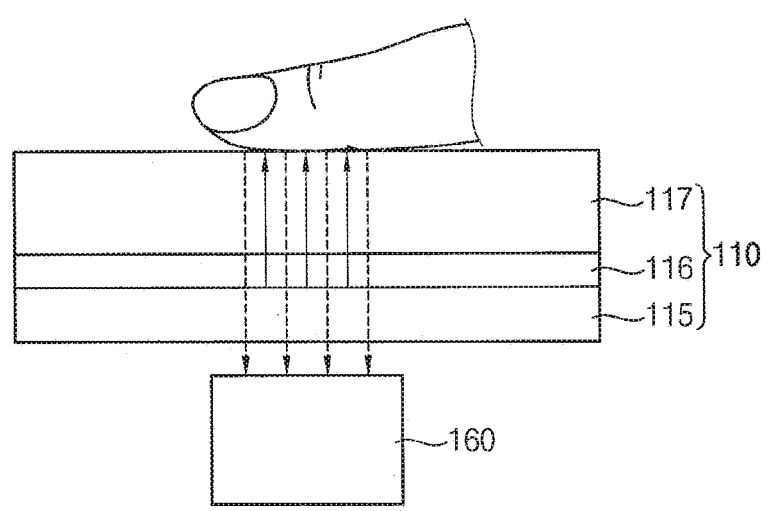

FIG. 1 is a block diagram illustrating a display device according to exemplary embodiments, and FIGS. 2A and 2B are diagrams illustrating a display panel included in the display device of FIG. 1.

Referring to FIG. 1, a display device 100 according to exemplary embodiments includes a display panel 110 and a fingerprint scan area compensator 120. Further, the display device 100 includes a data driver 140, a scan driver 130, and a timing controller 150.

The display panel 110 includes a plurality of pixels, along with a plurality of data lines and a plurality of scan lines formed in the display panel 110. The pixels are formed at intersection regions of the data lines and the scan lines. Each of the pixels may include sub-pixels that emit red light, green light, and blue light. Alternatively, each of the pixels may include sub-pixels that emit red light, green light, blue light, and white light. Each of the pixels emits light in response to a scan signal SS provided through the scan line and a data signal DS provided through the data line.

Referring to FIG. 2A, the display panel 110 includes a display area DA on which an image is displayed and a fingerprint scan area 112 overlapped with the display area DA. The display panel 110 may also include a non-display area NDA. The pixels are formed in the display area DA and the image is displayed on the display area DA. Circuits for providing signals to the pixels may be arranged in the non-display area NDA. The fingerprint scan area 112 may be formed overlapped with the display area DA. An image for scanning a fingerprint may be displayed on the pixels included in the fingerprint scan area 112 in a fingerprint scan mode of the display device 100. Although the image having a circular shape displayed on the fingerprint scan area 112 in the fingerprint scan mode is described in FIG. 2A, a shape of the image displayed on the fingerprint scan area 112 is not limited thereto. For example, the image having a polygonal shape may be displayed on the fingerprint scan area 112.

Referring to FIG. 2B, the display device 100 includes the display panel 110 and a light sensor 160. For example, the display panel 110 may be implemented as an organic light emitting display panel on which an organic light emitting diode are formed on a substrate, or as a liquid crystal display panel that includes a color filter layer and a liquid crystal layer formed between a first substrate and a second substrate. The display device 100 of which display panel 110 is implemented as the organic light emitting display panel will be described according to exemplary embodiments. The display panel 110 includes a display substrate 115, an adhesive layer 116, and a cover window 117. The organic light emitting diodes and thin film transistors for driving the organic light emitting diodes may be formed on the display substrate 115. The display panel 110 may further include a protecting layer (not shown) to protect a polarizer that controls a direction of light emitted from the organic light emitting diodes and the display substrate 115. The adhesive layer 117 attaches the display substrate 115 and the cover window 117. The adhesive layer 116 may be an optical clearly adhesive (OCA). The cover window 117 is disposed on the display substrate 115 and is attached to the display panel 110 using the adhesive layer 116. For example, the cover window 117 may include a substrate formed by mixing a glass fiber to a synthetic resin such as acryl resin, poly carbonate (PC), polyethylene terephthalate (PET), etc. The cover window 117 protects the display substrate 115 disposed under the cover window 117 from an eternal shock or pressure.

The display device 100 includes the light sensor 160 arranged under the fingerprint scan area 112. The image having a predetermined luminance is displayed on the fingerprint scan area 112 of the display panel, and the light sensor 160 senses light reflected from a finger of a user when the finger of the user touches the fingerprint scan area 112 (i.e., in the fingerprint scan mode). The light sensor 160 scans the fingerprint of the user by sensing the light reflected from the finger of the user. Here, luminance of light emitted from the organic light emitting diode decreases by passing the polarizer, the protect layer, and the cover window 117, etc., and luminance of the light reflected from the finger of the user decreases by passing the cover window 117, the protect layer, the polarizer, etc. Thus, the light sensor 160 senses the light reflected from the finger of the user when the luminance of the image displayed on the fingerprint scan area 112 is relatively high. For example, the luminance of the image displayed on the fingerprint scan area 112 in the fingerprint scan mode may be higher than 600 nit.

The luminance of the pixels that includes the organic light emitting diode because the organic light emitting diode may be degraded as time of use increases. A degradation speed of the pixels in the fingerprint scan area 112 may be faster than the degradation speed of the pixels not in the fingerprint scan area 112 because the image having a high luminance is displayed on the pixels in the fingerprint scan area 112. The light sensor 160 may not sense the light reflected from the finger of the user when the luminance of the light emitted from the pixels in the fingerprint scan area 112 decreases because of the degradation of the pixels. The display device 100 according to exemplary embodiments compensates the degradation of the pixels in the fingerprint scan area 112 by including the fingerprint scan area compensator 120 that converts a fingerprint scan image data provided to the pixels included in the fingerprint scan area 112 to a degradation compensating image data DCD_FS that compensates the degradation of the pixels included in the fingerprint scan area 112.

Specifically, the fingerprint scan area compensator 120 may include a stress data converter, a memory, and a degradation compensator (not shown in FIG. 1).

In some exemplary embodiments, the stress data converter converts the degradation compensating image data DCD_FS to a stress data. Here, the stress data includes luminance information of the degradation compensating image data DCD_FS. The stress data is a value that represents a degradation degree (i.e., luminance decreasing amount) of the pixel by displaying the degradation compensating image data DCD_FS on pixels in the display panel 110. For example, the stress data may be a grayscale value of the degradation compensating image data DCD_FS as it self, or may be a value that scales the grayscale value of the degradation compensating image data DCD_FS. Alternatively, the stress data may be a value that changes the grayscale value of the degradation compensating image data DCD_FS using a conversion coefficient that represents a correlation of the grayscale value and the degradation degree of the pixel by an experiment. The memory stores the stress data and output outputs an accumulated stress data on which the stress data are accumulated. The memory stores the stress data by every frame in the fingerprint scan mode of the display device 100. The memory may include a volatile memory and a non-volatile memory. The volatile memory receives the stress data and outputs the accumulated data by accumulating the stress data. The volatile memory transfers the accumulated stress data to the non-volatile memory in a predetermined cycle. The volatile memory provides the accumulated stress data to the non-volatile memory. The non-volatile memory stores the accumulated stress data when a power of the display device 100 turns off and transfers the accumulated stress data to the volatile memory when the power of the display device is turned on. Here, the non-volatile memory may have a small capacitance compared to a memory included in the display device that compensates a degradation of all pixels in the display device because the non-volatile memory of the display device 100 according to exemplary embodiments stores the accumulated stress data provided to the pixels in the fingerprint scan area 112. The degradation compensator compensates the fingerprint scan image data to the degradation compensating image data DCD_FS based on the accumulated stress data. The degradation compensator includes a first calculator and a second calculator. The first calculator calculates a degradation compensating amount of pixels in the fingerprint scan area 112 based on the accumulated stress data. Here, the first calculator calculates the degradation compensating amount based on the degradation compensating image data DCD_FS because the accumulated stress data on which the stress data are accumulated includes the luminance information of the degradation compensating image data DCD_FS. For example, the first calculator may calculate the degradation amount (i.e., the luminance decreasing amount) of the pixels in the fingerprint scan area 112 and calculate the degradation compensating amount from the degradation amount in a case that the degradation compensating image data DCD_FS having 200 grayscale is provided to the pixels in the fingerprint scan area 112 during 1000 frames, the degradation compensating image data DCD_FS having 205 grayscale is provided to the pixels in the fingerprint scan area 112 during 800 frames, and the degradation compensating image data DCD_FS having 210 grayscale is provided to the pixels in the fingerprint scan area 112 during 500 frames. The second calculator may generate the degradation compensating image data DCD_FS based on the degradation compensating amount. For example, the second calculator may output the degradation compensating image data DCD_FS having 215 grayscale when the degradation compensating amount is 15 grayscale, and the fingerprint scan image data provided to the degradation compensator is 200 grayscale.

In other exemplary embodiments, the stress data converter converts the fingerprint scan image data to the stress data. The stress data includes time information during which the fingerprint scan image data is provided when the stress data converter converts the stress data based on the fingerprint scan image data. For example, the stress data may be data that counts a frame in which the fingerprint scan image data is provided. The memory stores the stress data and outputs the accumulated stress data on which the stress data are accumulated. The memory stores the stress data by every frame in the fingerprint scan mode of the display device 100. That is, the memory stores the number of the frame in which the stress data is provided in the fingerprint scan mode. The memory may include the volatile memory and the non-volatile memory. The volatile memory receives the stress data and outputs the accumulated stress data on which the stress data are accumulated. The volatile memory transfers the accumulated stress data to the non-volatile memory in the predetermined cycle. The volatile memory provides the accumulated stress data to the non-volatile memory. The non-volatile memory stores the accumulated stress data when a power of the display device 100 is turned off and transfers the accumulated stress data to the volatile memory when the power of the display device is turned on. Here, the non-volatile memory may have a small capacitance comparing a memory included in the display device that compensates a degradation of all pixels in the display device because the non-volatile memory of the display device 100 according to exemplary embodiments stores the accumulated stress data provided to the pixels in the fingerprint scan area 112. The degradation compensator compensates the fingerprint scan image data to the degradation compensating image data DCD_FS based on the accumulated stress data. The degradation compensator includes a first calculator and a second calculator. The luminance information of the fingerprint scan image data is stored in the first calculator because the fingerprint scan image data having the same luminance are provided to the pixels in the fingerprint scan area 112 in the fingerprint scan mode. The first calculator calculates the degradation compensating amount of the pixels in the fingerprint scan area 112 based on the stored luminance information and the accumulated stress data on which the providing number of the fingerprint scan image data are accumulated. For example, the first calculator may calculate the degradation amount (i.e., the luminance decreasing amount) of the pixels in the fingerprint scan area 112 and calculate the degradation compensating amount based on the degradation amount in a case that the luminance information of the fingerprint scan image data having 200 grayscale is stored and the accumulated stress data is provided 1000 frames. The second calculator may generate the degradation compensating image data DCD_FS based on the degradation compensating amount. For example, the second calculator may output the degradation compensating image data DCD_FS having 215 grayscale when the degradation compensating amount is 15 grayscale, and the fingerprint scan image data having 200 grayscale is provided to the degradation compensator.

The scan driver 130 provides the scan signal to the pixels through the scan line. The data driver 140 generates the data signal DS provided to the pixels through the data line based on a second image data DATA2 provided from the timing controller 150 and the degradation compensating image data DCD_FS provided from the fingerprint scan image compensator 120. The data driver 140 provides the data signal DS based on the second image data DATA2 provided from the timing controller in a normal mode (i.e., not the fingerprint scan mode) of the display device 100. The data driver 140 generates the data signal DS that compensates the degradation of the pixels in the fingerprint scan area 112 based on the degradation compensating image data DCD_FS provided from the fingerprint scan area compensator 120 in the fingerprint scan mode of the display device 100. The timing controller 150 receives a control signal CON from an external device and generates control signals CTL1, CTL2 that control the scan data driver 130 and the data driver 140. Further, the timing controller 150 receives a first image data DATA1, generates the second image data DATA2, and provides the second image data DATA2 to the data driver 140. The timing controller 150 converts the first image data DATA1 to the second image data DATA2 using an algorithm for compensating display quality (e.g., a dynamic capacitance compensation (DCC)). The first image data DATA1 or the second image data DATA2 includes the fingerprint scan image data and the timing controller 150 provides the first image data DATA1 or the second image data DATA2 to the fingerprint scan area compensator 120 in the fingerprint scan mode of the display device 100.

Although the fingerprint scan area compensator 120 coupled to the timing controller 150 and the data driver 140 is described in FIG. 1, the fingerprint scan area compensator 120 is not limited thereto. For example, the fingerprint scan area compensator 120 may be include in the timing controller 150, or included in an embedded integration circuit (IC) that includes the timing controller 150 and the data driver 140.

As described above, the display device 100 of FIG. 1 compensates the degradation of the pixels in the fingerprint scan area 112 by converting the fingerprint scan image data provided to the pixels in the fingerprint scan area 112 to the degradation compensating image data DCD_FS. The display device 100 precisely senses the fingerprint of the user by preventing the luminance of the pixels in the fingerprint scan area 112 from decreasing by the degradation of the pixels. Here, the display device 100 includes the memory having a small capacitance because the memory stores the data of the pixels in the fingerprint scan area 112.

Figure 3:
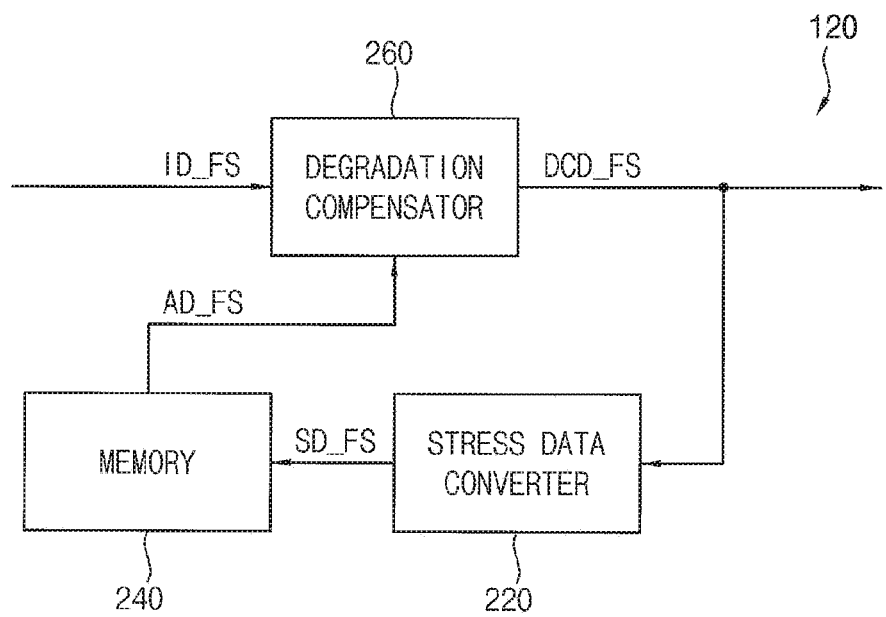
FIG. 3 is a block diagram illustrating an example of a fingerprint scan area compensator included in the display device of FIG. 1.
Figure 4:
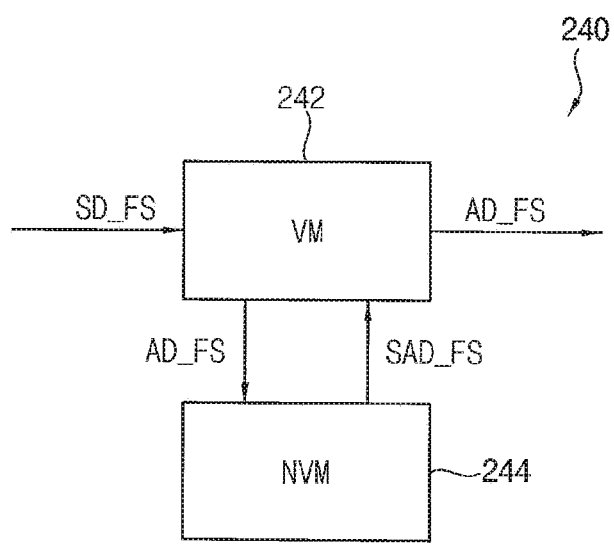
FIG. 4 is a block diagrams illustrating a memory included in the fingerprint scan area compensator of FIG. 3.
Figure 5:
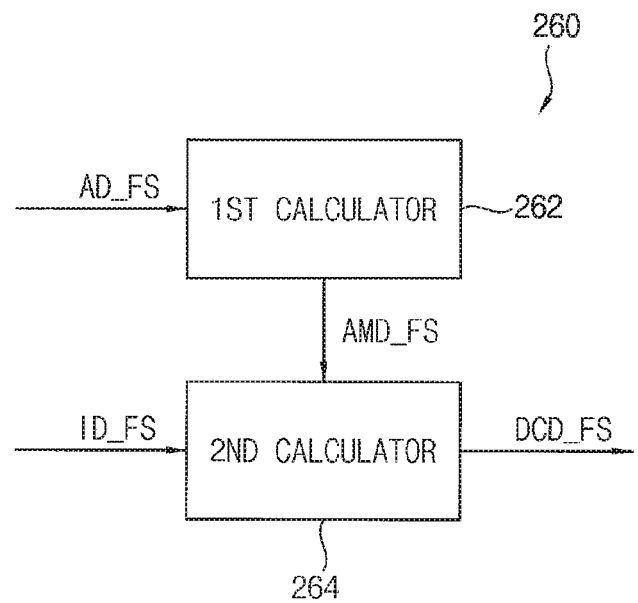
FIG. 5 is a block diagram illustrating a degradation compensator included in the fingerprint scan area compensator of FIG. 3.

FIG. 3 is a block diagram illustrating a specific example of a fingerprint scan area compensator 120 included in the display device 100 of FIG. 1. FIG. 4 is a block diagram illustrating a memory 240 included in the fingerprint scan area compensator 120 of FIG. 3. FIG. 5 is a block diagram illustrating a degradation compensator 260 included in the fingerprint scan area compensator 120 of FIG. 3.

Referring to FIG. 3, a fingerprint scan area compensator 200 includes a stress data converter 220, a memory 240, and a degradation compensator 260.

The stress data converter 220 converts a degradation compensating image data DCD_FS to a stress data SD_FS. The degradation compensator 260 outputs the degradation compensating image data DCD_FS in a fingerprint scan mode. For example, the degradation compensating image data DCD_FS of an Nth frame may be provided to the stress data converter 220 when a display device is operated in the fingerprint scan mode in the Nth frame and a (N+1)th frame, where N is equal to or greater than 1. Here, the stress data DS_FS includes luminance information of the degradation compensating image data DCD_FS. The stress data SD_FS may be a grayscale value of the degradation compensating image data DCD_FS as it self, or may be a value that scales the grayscale value of the degradation compensating image data DCD_FS. Alternatively, the stress data may be a value that changes the grayscale value of the degradation compensating image data DCD_FS using a conversion coefficient that represents a correlation of the grayscale value and the degradation degree of the pixel as determined by experiment.

The memory 240 stores the stress data SD_FS and outputs an accumulated stress data AD_FS on which the stress data SD_FS are accumulated. Referring to FIG. 4, the memory 240 includes a volatile memory 242 and a non-volatile memory 244. The memory 240 stores the stress data by every frame in the fingerprint scan mode of the display device 100. The volatile memory 242 stores the stress data SD_FS provided in the fingerprint scan mode by every frame. The volatile memory 242 receives a stored accumulated stress data SAD_FS stored in the non-volatile memory 244 and outputs the accumulated stress data AD_FS by adding the stress data SD_FS to the stored accumulated stress data SAD_FS. Further, the volatile memory 242 transfers the accumulated stress data AD_FS to the non-volatile memory 242 in a predetermined cycle. For example, the volatile memory 242 may include one of an EDRAM device, a dynamic random access memory (DRAM) device, a static random access memory (SRAM) device, a mobile DRAM device, etc. The non-volatile memory 244 receives the accumulated stress data AD_FS from the volatile memory 242 in the predetermined cycle, and stores the accumulated stress data AD_FS provided from the volatile memory 242 as the stored accumulated stress data SAD_FS when the power of the display device is turned off. Further, the non-volatile memory 244 transfers the stored accumulated stress data SAD_FS to the volatile memory 242 when the power of the display device is turned on. For example, the non-volatile memory 244 may include one of an erasable programmable read-only memory (EPROM) device, an electrically erasable programmable read-only memory (EEPROM) device, a flash memory device, a phase change random access memory (PRAM) device, a resistance random access memory (RRAM) device, a magnetic random access memory (MRAM) device, a ferroelectric random access memory (FRAM) device, etc. An amount of data stored in the non-volatile memory 244 may rapidly increase when the display device simultaneously compensates the degradation of pixels in the display area. The display device 100 according to exemplary embodiments may use the non-volatile memory 244 having low capacity by partially compensating the degradation of pixels included in the fingerprint scan area on which the image having high luminance is displayed.

The degradation compensator 260 compensates the fingerprint scan image data ID_FS to the degradation compensating image data DCD_FS based on the accumulated stress data AD_FS. Referring to FIG. 5, the degradation compensator 260 includes a first calculator 262 and a second calculator 264. The first calculator 262 calculates a degradation compensating amount AMD_FS of the pixels included in the fingerprint scan area based on the accumulated stress data AD_FS. The first calculator 262 calculates a degradation amount of the pixels in the fingerprint scan area based on the accumulated stress data AD_FS and calculates the degradation compensating amount AMD_FS based on the degradation amount. For example, the first calculator 262 may calculate a value corresponding to 2 grayscale as the degradation compensating amount AMD_FS when the luminance of the pixels in the fingerprint scan area decreases as the 2 grayscale. The second calculator 164 may generate a degradation compensating image data DCD_FS based on the degradation compensating amount AMD_FS. The second calculator 264 may generate the degradation compensating image data DCD_FS by adding the degradation compensating image data DCD_FS to the fingerprint scan image data ID_FS. For example, the second calculator 264 may receive the degradation compensating amount AMD_FS corresponding to the 2 grayscale from the first calculator 262, and generate the degradation compensating image data DCD_FS by adding the degradation compensating amount to the fingerprint scan image data ID_FS. Alternatively, the second calculator 264 may generating the degradation compensating image data ID_FS by multiplexing the degradation compensating amount AMD_FS by the fingerprint scan image data ID_FS.

Figure 6:
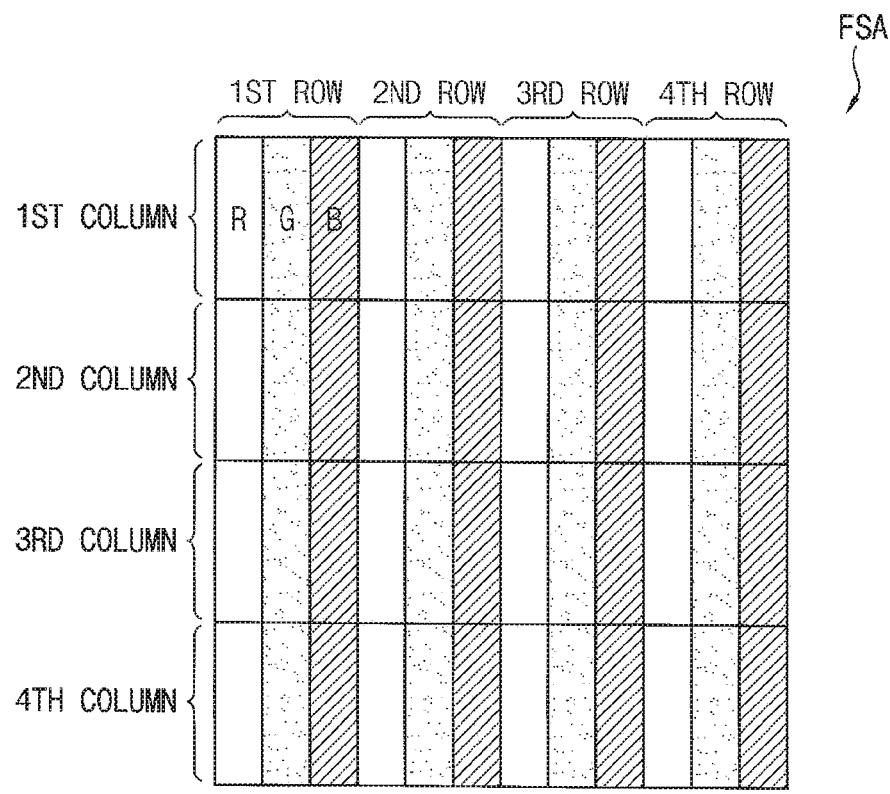
FIG. 6 is a block diagram for describing an operation of a stress data converter included in the fingerprint scan area compensator of FIG. 3.
Figure 7:
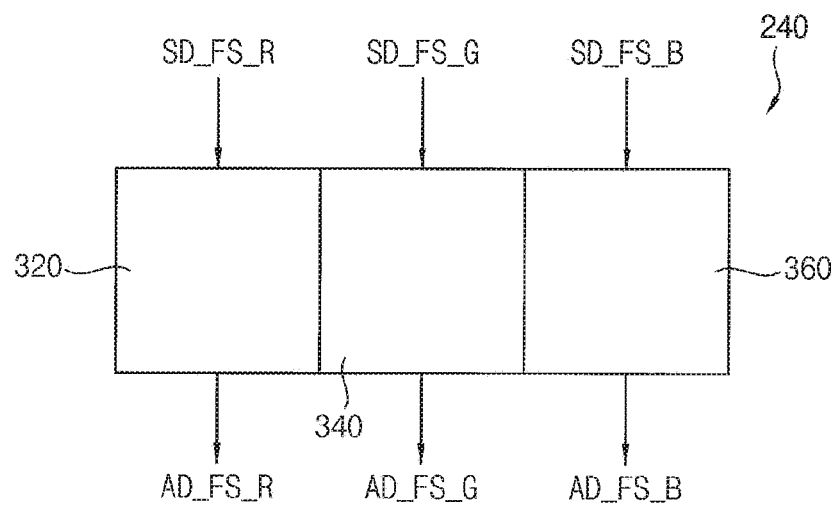
FIG. 7 is a diagram illustrating an example of the memory of FIG. 4.

FIG. 6 is a block diagram describing an operation of a stress data converter 220 included in the fingerprint scan area compensator 120 of FIG. 3, and FIG. 7 is a diagram illustrating an example of the memory 240 of FIG. 4.

Referring to FIG. 6, the fingerprint scan area FSA may include a plurality of pixels. In some exemplary embodiments, the stress data converter 220 selects one of the pixels in the fingerprint scan area FSA as a representative pixel and converts the degradation compensating image data provided to the representative pixel to the stress data. Here, the stress data converter 220 sequentially changes the selected representative pixel. For example, the stress data converter 220 may select the pixel in a first row and a first column as the representative pixel in the Nth frame; may select the pixel in the first row and a second column as the representative pixel in the (N+1)th frame; and may select the pixel in the first row and a third column as the representative pixel in the (N+2)th frame when the display device is operated in the fingerprint scan mode in the Nth frame through the (N+2)th frame. In other exemplary embodiments, the stress data converter 220 converts an average value of the degradation compensating image data provided to the pixels included in the fingerprint scan area FSA to the stress data. As shown in FIG. 6, the stress data converter 220 outputs the average value of the degradation compensating image data provided to 16 pixels as the stress data when the fingerprint scan area includes the 16 pixels.

Referring to FIG. 6, each of the pixels includes a red sub-pixel R that displays red light, a green sub-pixel G that displays green light, and a blue sub-pixel B that displays blue light.

Referring to FIG. 7, the memory 240 includes a first memory 320 that stores a stress data SD-FS_R of the red sub-pixel R and outputs an accumulated stress data AD_FS_R of the red sub-pixel R, a second memory 340 that stores a stress data SD-FS_G of the green sub-pixel G and outputs an accumulated stress data AD_FS_G of the red sub-pixel G, and a third memory 360 that stores a stress data SD-FS_B of the blue sub-pixel B and outputs an accumulated stress data AD_FS_B of the blue sub-pixel B. Each of the first memory 320, the second memory 340, and the third memory 360 may include the volatile memory 242 (FIG. 4)

that accumulates the stress data while the power off the display device turns on and the non-volatile memory 244 (FIG. 4) that stores the accumulated stress data while the power of the display device 100 is turned off and provides the accumulated stress data to the volatile memory 242 when the power of the display device 100 is turned on.

The degradation compensator 260 generates the degradation compensating image data provided to each of the red sub-pixel R, the green sub-pixel G, and the blue sub-pixel B. Specifically, the degradation compensator 260 generates the degradation compensating image data of the red sub-pixel R based on the accumulated stress data AD_FS_R of the red sub-pixel R; generates the degradation compensating image data of the green sub-pixel G based on the accumulated stress data AD_FS_G of the green sub-pixel G; and generates the degradation compensating image data of the blue sub-pixel B based on the accumulated stress data AD_FS_B of the blue sub-pixel B.

Figure 8:
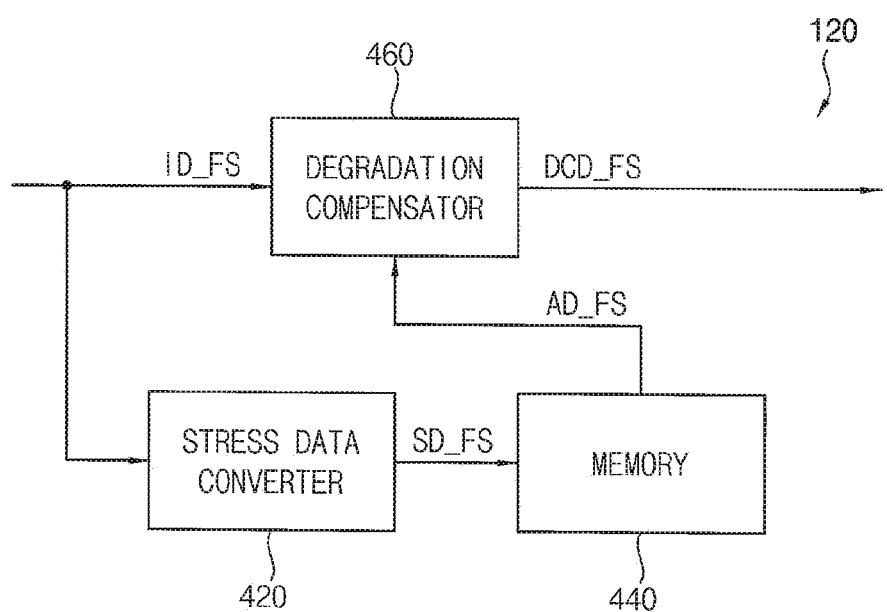
FIG. 8 is a block diagram illustrating another example of the fingerprint scan area compensator included in the display device of FIG. 1.

FIG. 8 is a block diagram illustrating another specific example of the fingerprint scan area compensator 120 included in the display device 100 of FIG. 1.

Referring to FIG. 8, a fingerprint scan area compensator 120 includes a stress data converter 420, a memory 440, and a degradation compensator 460.

The stress data converter 420 converts a fingerprint scan image data ID_FS to the stress data SD_FS. The fingerprint scan image data ID_FS is provided in a fingerprint scan mode. The stress data converter 420 converts the fingerprint scan image data ID_FS to the stress data SD_FS that includes time information. For example, the stress data SD_FS may be data that counts the number of frames in which the fingerprint scan image data ID_FS is provided.

The memory 440 stores the stress data SD_FS and outputs an accumulate stress data on which the stress data SD_FS are accumulated. The memory 440 includes a volatile memory and a non-volatile memory (similar to what is shown in FIG. 4). The volatile memory stores the stress data SD_FS provided in the fingerprint scan mode by every frame. The volatile memory receives a stored accumulated stress data SAD_FS from the non-volatile memory when the power of the display device is turned on and outputs the accumulated stress data AD_FS by adding the stress data SD_FS provided to the stored accumulated stress data SAD_FS. Further, the non-volatile memory transfers the accumulated stress data AD_FS to the non-volatile memory in the predetermined cycle. The non-volatile memory receives the accumulated stress data AD_FS provided from the volatile memory in the predetermined cycle, and stores the accumulated stress data AD_FS from the volatile memory as the stored accumulated stress data SAD_FS when the power of the display device is turned off. Further, the non-volatile memory may provide the stored accumulated stress data SAD_FS to the volatile memory when the power of the display device turns on. An amount of data stored in the non-volatile memory may rapidly increase when the display device simultaneously compensates the degradation of pixels in the display area. The display device according to exemplary embodiments utilizes the non-volatile memory having low capacity by partially compensating the degradation of pixels included in the fingerprint scan area on which the image having high luminance is displayed.

The degradation compensator 460 compensates the fingerprint scan image data ID_FS to the degradation compensating image data DCD_FS based on the accumulated stress data AD_FS. The degradation compensator 460 includes a first calculator and a second calculator (similar to what is shown in FIG. 5). The first calculator calculates the degradation compensating amount of the pixels in the fingerprint scan area based on the accumulated stress data AD_FS. The first calculator calculates the degradation amount of the pixels in the fingerprint scan area based on the accumulated stress data AD_FS and calculate the degradation compensating amount based on the degradation amount. The first calculator stores a degradation degree of the pixels in the fingerprint scan area when the fingerprint scan image data ID_FS is displayed on the fingerprint scan area; calculates the degradation amount of the pixels in the fingerprint scan area based on the accumulated stress data AD_FS that represents a providing number of the fingerprint scan image data ID_FS is provided; and calculates the degradation compensating amount that compensates the degradation of the pixels. The second calculator generates the degradation compensating image data DCD_FS based on the degradation compensating amount. The second calculator generates the degradation compensating image data DCD_FS by adding the degradation compensating image data DCD_FS to the fingerprint scan image data ID_FS. For example, the second calculator may receive the degradation compensating amount corresponding to the second grayscale from the first calculator and generate the degradation compensating image data DCD_FS by adding the degradation compensation amount to the fingerprint scan image data ID_FS. Alternatively, the second calculator may generate the degradation compensating image data DCD_FS by multiplexing the degradation compensating amount by the fingerprint scan image data ID_FS.

Figure 9:
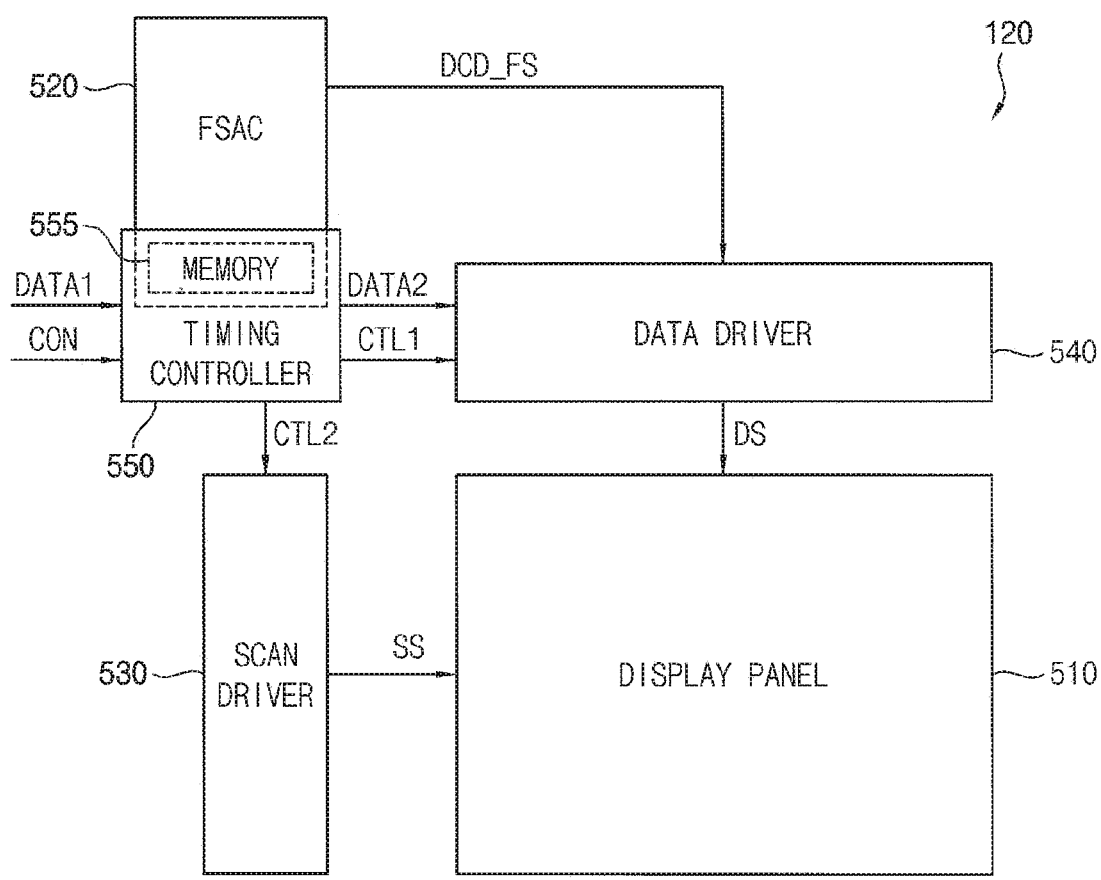
FIG. 9, FIG. 10, and FIG. 11 are block diagrams illustrating an example of the display device of FIG. 1.
Figure 10:
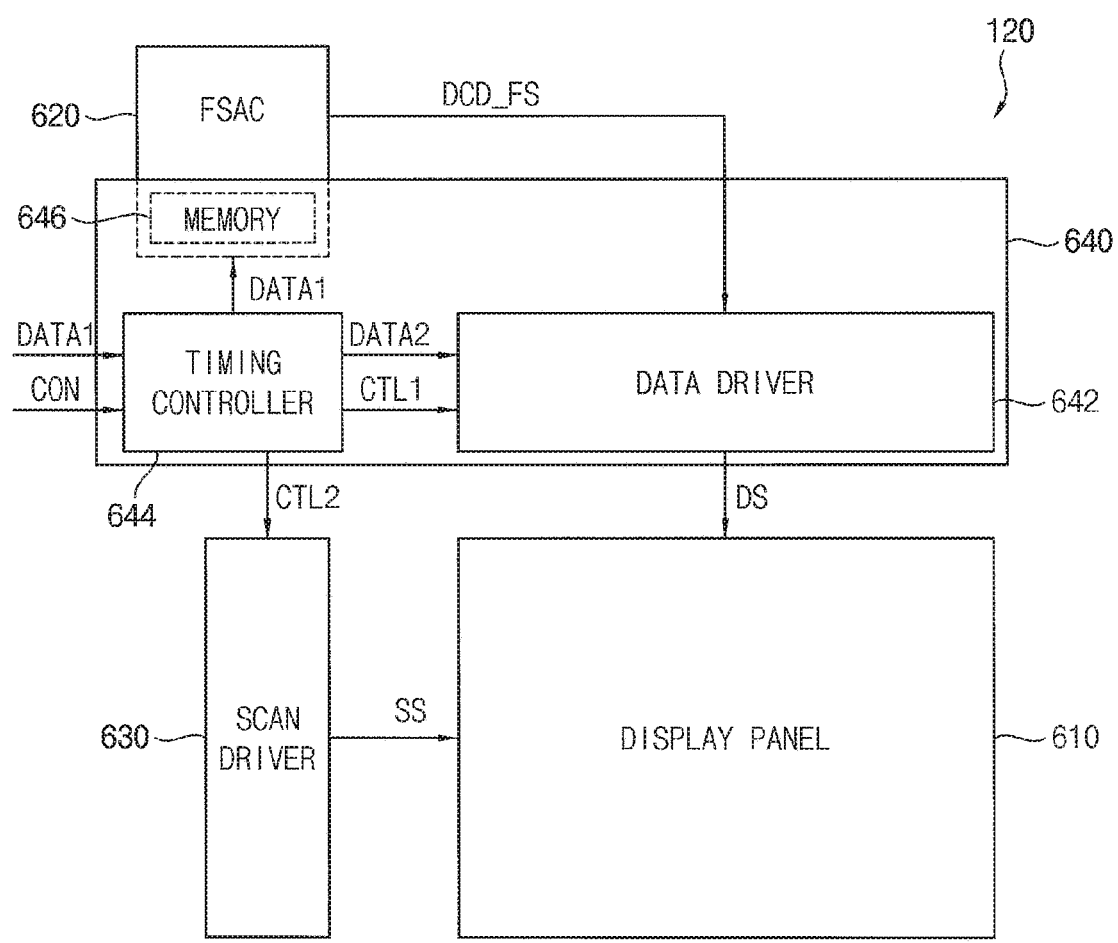
Figure 11:
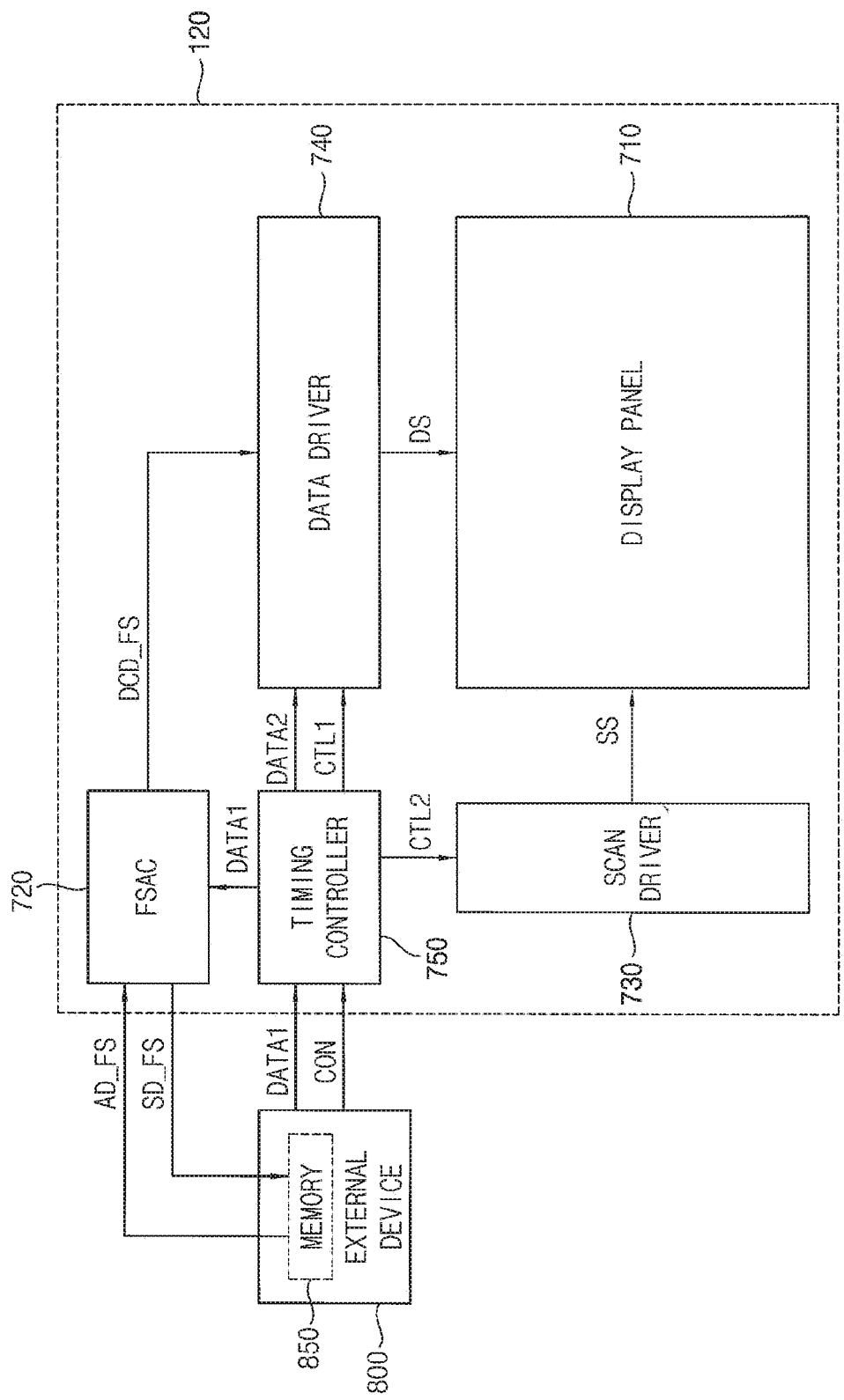

FIGS. 9 through 11 are block diagrams illustrating specific examples of the display device 100 of FIG. 1.

A display device according to exemplary embodiments may use a non-volatile memory having low capacity by compensating a degradation of pixels in the fingerprint scan area on which an image having high luminance is displayed.

Referring to FIG. 9, a display device 100 includes a display panel 510, a fingerprint scan area compensator 520, a data driver 540, a scan driver 530, and a timing controller 550. The display panel 510, the fingerprint scan area compensator 520, the data driver 540, the scan driver 530, and the timing controller 550 of FIG. 9 may be substantially similar to or the same as the display panel 110, the fingerprint scan area compensator 120, the data driver 140, the scan driver 130, and the timing controller 150 of FIG. 1. The fingerprint scan area compensator 520 is coupled to the timing controller 550. Here, the memory 555 of the fingerprint scan area compensator 520 is located in the timing controller 550. For example, the memory 555 of the fingerprint scan area compensator 520 may be implemented as the EEPROM device in the timing controller 550.

Referring to FIG. 10, a display device 100 includes a display panel 610, a fingerprint scan area compensator 620, a data driver 642, a scan driver 630, and a timing controller 644. The display panel 610, the fingerprint scan area compensator 620, the data driver 642, the scan driver 630, and the timing controller 644 of FIG. 10 may be substantially similar to or the same as the display panel 110, the fingerprint scan area compensator 120, the data driver 140, the scan driver 130, and the timing controller 150 of FIG. 1. The data driver 642 and the timing controller 644 is implemented as an embedded integrated circuit 640. The fingerprint scan area compensator 620 is coupled to the embedded integrated circuit 640. Here, the memory 646 of the fingerprint scan area compensator 620 is located in the embedded integrated circuit 640. For example, the memory 464 of the fingerprint scan area compensator 620 may be implemented as a non-volatile memory device of the embedded integrated circuit 640.

Referring to FIG. 11, a display device 100 includes a display panel 710, a fingerprint scan area compensator 720, a data driver 740, a scan driver 730, and a timing controller 750. The display panel 710, the fingerprint scan area compensator 720, the data driver 740, the scan driver 730, and the timing controller 750 of FIG. 11 may be substantially similar to or the same as the display panel 110, the fingerprint scan area compensator 120, the data driver 140, the scan driver 130, and the timing controller 150 of FIG. 1. The fingerprint scan area compensator 720 is coupled to an external device 800. For example, the external device 800 may be a processor that provides an image signal to the display device 700. Here, the memory 850 of the fingerprint scan area compensator 720 is located in the external device 800. For example, the memory 850 of the fingerprint scan area compensator 720 may be implemented as a non-volatile memory device included in the external device 800 coupled to the display device 700.

Figure 12:
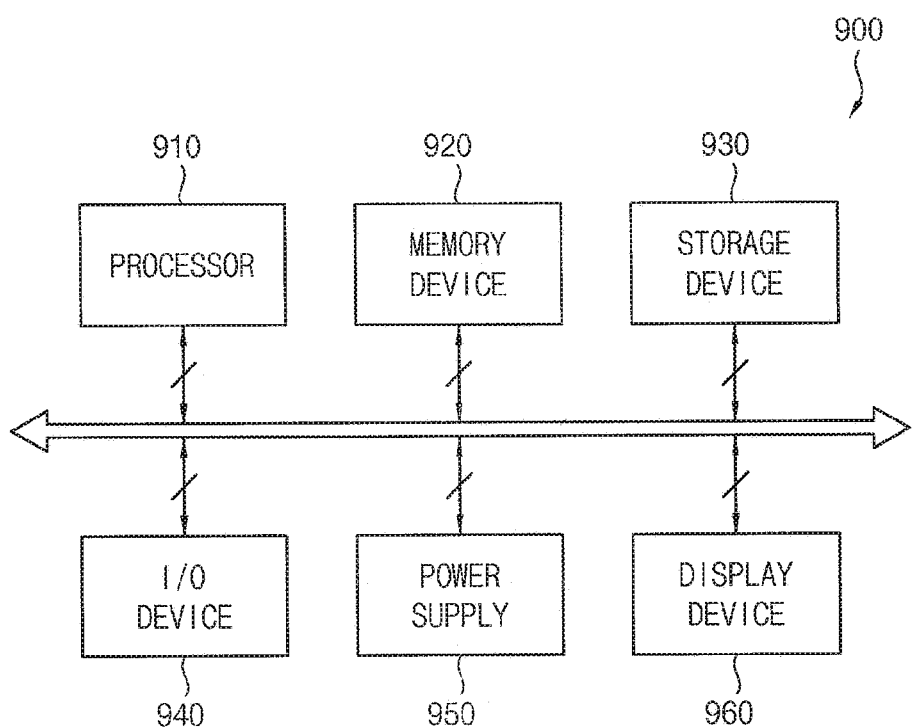
FIG. 12 is a block diagram illustrating an electronic device according to exemplary embodiments.
Figure 13:
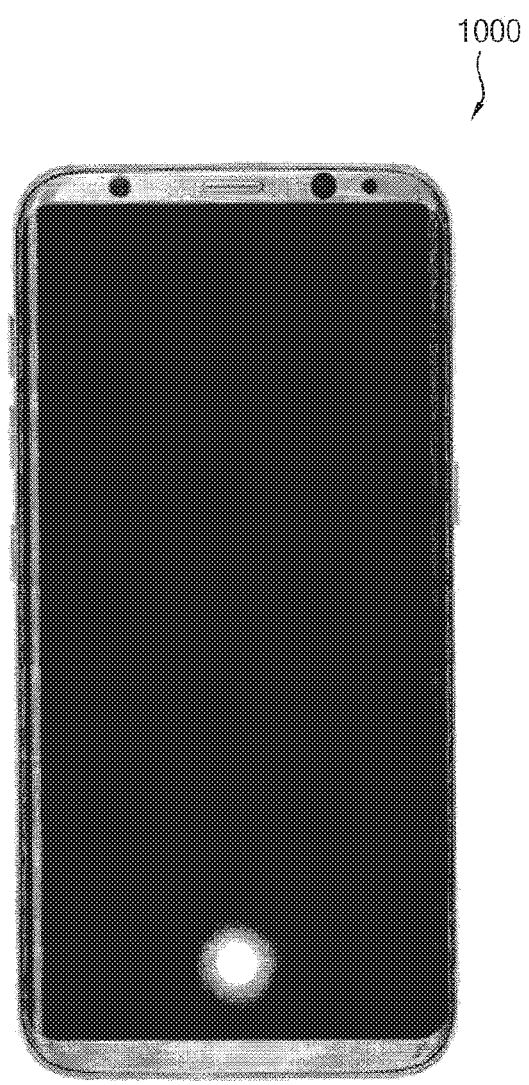
FIG. 13 is a diagram illustrating an exemplary embodiment in which the electronic device of FIG. 12 is implemented as a smart phone.

FIG. 12 is a block diagram illustrating an electronic device according to exemplary embodiments, and FIG. 13 is a diagram illustrating an exemplary embodiment in which the electronic device of FIG. 12 is implemented as a smart phone.

Referring to FIGS. 12 and 13, an electronic device 900 includes a processor 910, a memory device 920, a storage device 930, an input/output (I/O) device 940, a power device 950, and a display device 960. Here, the display device 960 may correspond to the display device 100 of FIG. 1. In addition, the electronic device 900 may further include a plurality of ports for communicating a video card, a sound card, a memory card, a universal serial bus (USB) device, other electronic device, etc. Although it is illustrated in FIG. 13 that the electronic device 900 is implemented as a smart phone 1000, a kind of the electronic device 900 is not limited thereto.

The processor 910 may perform various computing functions. The processor 910 may be a microprocessor, a central processing unit (CPU), etc. The processor 910 may be coupled to other components via an address bus, a control bus, a data bus, etc. Further, the processor 910 may be coupled to an extended bus such as surrounded component interconnect (PCI) bus. The memory device 920 may store data for operations of the electronic device 900. For example, the memory device 920 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile DRAM device, etc. The storage device 930 may be a solid stage drive (SSD) device, a hard disk drive (HDD) device, a CD-ROM device, etc.

The I/O device 940 may be an input device, such as a keyboard, a keypad, a touchpad, a touch-screen, a mouse, etc, and an output device such as a printer, a speaker, etc. In some exemplary embodiments, the display device 960 may be included in the I/O device 940. The power device 950 provides power for operations of the electronic device 900. The display device 960 may communicate with other components via the buses or other communication links. As described above, the display device 960 includes a display panel and a fingerprint scan area compensator. The display panel includes a plurality of pixels. The display panel may include a display area on which an image is displayed and a fingerprint scan area overlapped with the display area. The fingerprint scan area compensator may include a stress data converter, a memory, and a degradation compensator. In some exemplary embodiments, the stress data converter converts a degradation compensating image data to a stress data. Here, the stress data may include luminance information. In other exemplary embodiments, the stress data converter may convert the fingerprint scan image data to the stress data. The stress data includes time information during which the fingerprint scan image data is provided when the stress data converter converts the stress data based on the fingerprint scan image data. The memory stores the stress data and outputs an accumulated stress data on which the stress data are accumulated. The memory may include a volatile memory and a non-volatile memory. The volatile memory receives the stress data and output the accumulated stress data on which the stress data are accumulated. The volatile memory transfers the accumulated stress data to the on-volatile memory in a predetermined cycle. The volatile memory provides the accumulated stress data to the non-volatile memory because the volatile memory does not store the data after the power of the display device 960 is turned off. The non-volatile memory transfers the stored accumulated stress data to the volatile memory when the power of the display device 960 is turned on. Here, the non-volatile memory has a low capacity comparing to a memory in a degradation compensator that compensates all pixels in the display panel because the degradation compensator according to exemplary embodiments stores the accumulated stress data provided the pixels in the fingerprint scan area. The degradation compensator compensates the fingerprint scan image data to the degradation compensating image data based on the accumulated stress data. The degradation compensator calculates a degradation amount based on an emission luminance and an emission time of the pixels in the fingerprint scan area when the stress data converter converts the degradation compensating image data to the stress data. The degradation compensator calculates the degradation compensating amount based on the emission time of the pixels included in the fingerprint scan area and a predetermined luminance of the fingerprint scan image data. The degradation compensator outputs the fingerprint scan image data as the degradation compensating image data based on the degradation compensating amount.

As described above, the electronic device 900 compensates the degradation of the pixels in the fingerprint scan area by converting the fingerprint scan image data provided to the pixels in the fingerprint scan area to the degradation compensating image data in the fingerprint scan mode. Here, the memory having a low capacity may be used because the display device 960 compensates the pixels in the fingerprint scan area.

The inventive concepts may be applied to a display device and an electronic device having the display device. For example, the present inventive concept may be applied to a computer monitor, a laptop, a digital camera, a cellular phone, a smart phone, a smart pad, a television, a personal digital assistant (PDA), a portable multimedia player (PMP), a MP3 player, a navigation system, a game console, a video phone, etc.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
 a display panel comprising a display area on which an image is displayed and a fingerprint scan area overlapped with the display area; and
 a fingerprint scan area compensator configured to convert a fingerprint scan image data provided to pixels included in the fingerprint scan area to a degradation compensating image data that compensates a degradation of the pixels included in the fingerprint scan area and outputs the degradation compensating image data in a fingerprint scan mode,
 wherein:
 the fingerprint scan area compensator comprises:
  a stress data converter configured to convert the degradation compensating image data to a stress data;
  a memory configured to store the stress data and output an accumulated stress data on which the stress data are accumulated; and
  a degradation compensator configured to compensate the fingerprint scan image data to the degradation compensating image data based on the accumulated stress data; and
 the stress data comprises one of:
  a value that scales the grayscale value of the degradation compensating image data; or
  a value that changes the grayscale value of the degradation compensating image data using a conversion coefficient that represents a correlation of the grayscale value and the degradation degree of the pixels as determined by experiment.

2. The display device of claim 1, wherein the memory comprises:
 a volatile memory configured to receive the stress data and output the accumulated stress data by accumulating the stress data; and
 a non-volatile memory configured to store the accumulated stress data provided from the volatile memory.

3. The display device of claim 2, wherein:
 the volatile memory is configured to provide the accumulated stress data to the non-volatile memory in a predetermined cycle; and
 the non-volatile memory is configured to provide the accumulated stress data to the volatile memory when power to the display device is turned on.

4. The display device of claim 1, wherein the degradation compensator comprises:
 a first calculator configured to calculate a degradation compensating amount of the fingerprint scan area based on the accumulated stress data; and
 a second calculator configured to generate the degradation compensating image data based on the degradation compensating amount.

5. The display device of claim 1, wherein the stress data converter is configured to:
 select one of the pixels included in the fingerprint scan area as a representative pixel;
 convert the degradation compensating image data provided to the representative pixel to the stress data; and
 sequentially change the representative pixel.

6. The display device of claim 1, wherein the stress data converter is configured to convert an average value of the degradation compensating image data provided to the pixels included in the fingerprint scan area to the stress data.

7. The display device of claim 1, wherein the stress data converter is configured to:
 convert a red degradation compensating image data provided to a red sub-pixel of the pixels included in the fingerprint scan area to a red stress data;
 convert a green degradation compensating image data provided to a green sub-pixel of the pixels included in the fingerprint scan area to a green stress data; and
 convert a blue degradation compensating image data provided to a blue sub-pixel of the pixels included in the fingerprint scan area to a blue stress data.

8. The display device of claim 7, wherein the memory is configured to:
 store a red accumulated stress data on which the red stress data are accumulated,
 store a green accumulated stress data on which the green stress data are accumulated;
 and store a blue accumulated stress data on which the blue stress data area accumulated.

9. The display device of claim 1, further comprising a timing controller,
 wherein the fingerprint scan area compensator is coupled to the timing controller, and a memory of the fingerprint scan area compensator is located in the timing controller.

10. The display device of claim 1, further comprising:
 a data driver configured to provide a data signal to the display panel; and
 a timing controller configured to generate a control signal that controls the data driver,
 wherein:
 the data driver and the timing controller are implemented as an embedded integrated circuit;
 the fingerprint scan area compensator is coupled to the embedded integrated circuit; and
 a memory of the fingerprint scan area compensator is located in the embedded integrated circuit.

11. The display device of claim 1, wherein:
 the fingerprint scan area compensator is coupled to an external device; and
 a memory of the fingerprint scan area compensator is located in the external device.

12. The display device of claim 1, wherein the fingerprint scan area compensator comprises:
 a stress data converter configured to convert the fingerprint scan image data to a stress data;
 a memory configured to store the stress data and output an accumulated stress data on which the stress data are accumulated; and
 a degradation compensator configured to generate the degradation compensating image data that compensates a degradation of the fingerprint scan area based on the accumulated stress data.

13. The display device of claim 12, wherein the stress data includes time information during which the fingerprint scan image data is provided.

14. The display device of claim 12, wherein the memory comprises:
 a volatile memory configured to receive the stress data and output the accumulated stress data by accumulating the stress data; and a non-volatile memory configured to store the accumulated stress data provided from the volatile memory.

15. An electronic device including a display device and a processor that controls the display device, the display device comprising:
   a display panel comprising a display area on which an image is displayed and a fingerprint scan area overlapped with the display area; and
   a fingerprint scan area compensator configured to convert a fingerprint scan image data provided to pixels included in the fingerprint scan area to a degradation compensating image data that is configured to compensate a degradation of the pixels included in the fingerprint scan area and output the degradation compensating image data in a fingerprint scan mode,
wherein:
the fingerprint scan area compensator comprises:
   a stress data converter configured to convert the degradation compensating image data to a stress data;
   a memory configured to store the stress data and output an accumulated stress data on which the stress data are accumulated; and
   a degradation compensator configured to compensate the fingerprint scan image data to the degradation compensating image data based on the accumulated stress data; and
the stress data comprises one of:
   a value that scales the grayscale value of the degradation compensating image data; and
   a value that changes the grayscale value of the degradation compensating image data using a conversion coefficient that represents a correlation of the grayscale value and the degradation degree of the pixels as determined by experiment.

16. An electronic device including a display device and a processor that controls the display device, the display device comprising:
   a display panel comprising a display area on which an image is displayed and a fingerprint scan area overlapped with the display area; and
   a fingerprint scan area compensator configured to convert a fingerprint scan image data provided to pixels included in the fingerprint scan area to a degradation compensating image data that is configured to compensate a degradation of the pixels included in the fingerprint scan area and output the degradation compensating image data in a fingerprint scan mode,
wherein:
the fingerprint scan area compensator comprises:
   a stress data converter configured to convert the fingerprint scan image data to a stress data;
   a memory configured to store the stress data and output an accumulated stress data on which the stress data are accumulated; and
   a degradation compensator configured to generate the degradation compensating image data that compensates a degradation of the fingerprint scan area based on the accumulated stress data; and
the stress data comprises one of:
   a value that scales the grayscale value of the degradation compensating image data; and
   a value that changes the grayscale value of the degradation compensating image data using a conversion coefficient that represents a correlation of the grayscale value and the degradation degree of the pixels as determined by experiment.

17. The electronic device of claim 15, wherein:
the fingerprint scan area compensator is configured to generate the degradation compensating image data of the pixels included in the fingerprint scan area; and
the fingerprint scan area compensator is configured to not generate the degradation compensating image data of the pixels not included in the fingerprint scan area.

18. The electronic device of claim 16, wherein:
the fingerprint scan area compensator is configured to generate the degradation compensating image data of the pixels included in the fingerprint scan area; and
the fingerprint scan area compensator is configured to not generate the degradation compensating image data of the pixels not included in the fingerprint scan area.

* * * * *